United States Patent
Plewnia

(10) Patent No.: US 7,228,357 B2
(45) Date of Patent: Jun. 5, 2007

(54) SYSTEM AND METHOD FOR AUTOMATIC DIGITAL DOCUMENT PROCESSING

(75) Inventor: Boguslaw Ludwik Plewnia, Mission Viejo, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 827 days.

(21) Appl. No.: 10/253,112

(22) Filed: Sep. 23, 2002

(65) Prior Publication Data

US 2004/0073613 A1 Apr. 15, 2004

(51) Int. Cl.
*G06F 15/173* (2006.01)

(52) U.S. Cl. ............... 709/238; 709/203; 709/217

(58) Field of Classification Search ........... 709/203, 709/217, 238
See application file for complete search history.

(56) References Cited

U.S. PATENT DOCUMENTS

| | | | |
|---|---|---|---|
| 5,862,325 A | 1/1999 | Reed et al. | |
| 6,088,717 A | 7/2000 | Reed et al. | |
| 6,151,624 A | 11/2000 | Teare et al. | |
| 6,877,134 B1 * | 4/2005 | Fuller et al. | 715/500.1 |
| 2003/0001880 A1 * | 1/2003 | Holtz et al. | 345/716 |
| 2003/0097462 A1 * | 5/2003 | Parent et al. | 709/236 |
| 2003/0135857 A1 * | 7/2003 | Pendakur et al. | 725/61 |
| 2003/0140185 A1 * | 7/2003 | Cherry et al. | 710/15 |
| 2003/0177248 A1 * | 9/2003 | Brown et al. | 709/229 |
| 2004/0205653 A1 * | 10/2004 | Hadfield et al. | 715/530 |

* cited by examiner

*Primary Examiner*—David Wiley
*Assistant Examiner*—Phuoc Nguyen
(74) *Attorney, Agent, or Firm*—Law Office of Gerald Maliszewski; Gerald Maliszewski

(57) ABSTRACT

In a network of connected nodes, a system and method are provided for automatic digital document processing. The method comprises: embedding a processing profile with a digital document; and, processing the digital document in response to the embedded processing profile. Typically, embedding the processing profile includes generating a packet having a metadata section with the processing profile and a data section with the digital document. Then, processing the digital document includes a current node extracting current node process and routing instructions. In some aspects of the method, processing the digital document includes the current (first) node determining a next (second) network-connected node from the node routing instructions. Then, the method further comprises: sending the metadata section packet from the current (first) node to the next (second) node; and, receiving the packet at the current (second) node; and, processing the digital document at the current (second) node.

14 Claims, 5 Drawing Sheets

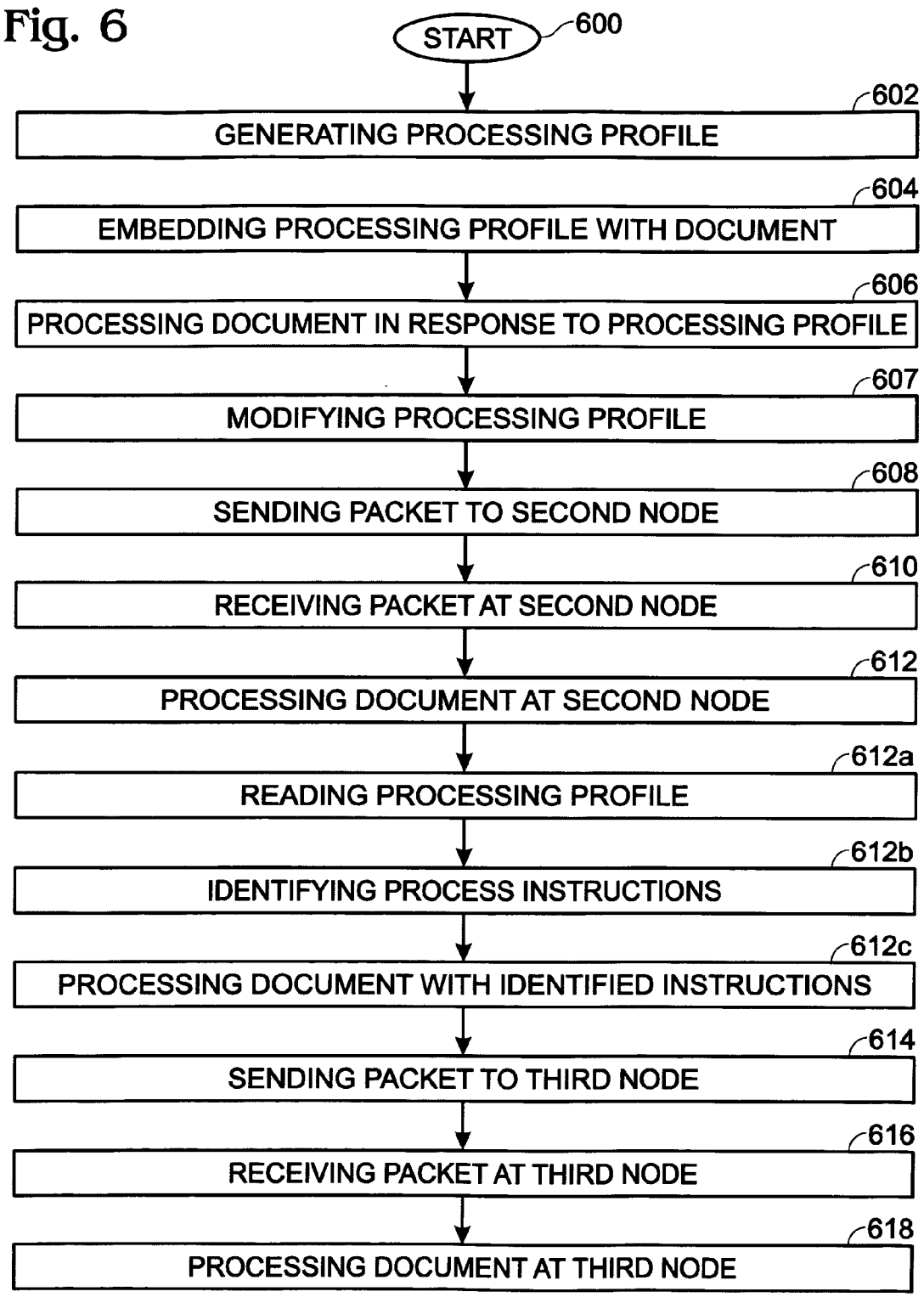

# SYSTEM AND METHOD FOR AUTOMATIC DIGITAL DOCUMENT PROCESSING

BACKGROUND OF THE INVENTION

1. Field of the Invention

This invention generally relates to document processing and, more particularly, to a system and method for embedding a digital document with instructions to be performed by networked document processing devices

2. Description of the Related Art

Conventionally, processing the digital contents of a document at some processing device or node, such as a printer, scanner, facsimile (FAX), multifunction processor (MFP), or the like, requires that the processing device be preset to perform a specific operation or sequence of operations. This predefined set of operations is necessarily performed on all documents or digital content reaching this particular device. Dynamically changing the way the digital content is processed requires at least some human involvement in changing the settings of the processing device. Alternately stated, the processing knowledge, or document processing instructions, is directly associated with the processing device, since the device is preset for a specific operation.

With conventional document processing, a digital document can travel from point "A" to point "B", where predefined operations are performed. Then, the document travels to point "C" for some additional predefined processing. Any dynamic changes to the above processing flow are difficult to implement. In situations where dynamic changes to the processing instructions are required, they must be implemented by a human operator. This type of dynamic processing is very costly, time consuming, inefficient, and prone to error.

It would be advantageous if processing instructions for a digital document processor device could be dynamically updated in an easy manner.

It would be advantageous if processing instructions for a document processor device could be network-communicated with the digital document to be processed.

SUMMARY OF THE INVENTION

The present invention describes a method that makes use of metadata to communicate electronic (digital) document processing steps and routing instructions in a distributed environment or network The metadata can be used to describe document-specific detailed processing steps, processing operations, and routing instructions. The processing instructions are directly attached to the digital document itself. That is, the processing instructions travel together with the digital document through the network.

When a document is being scanned, for example on an enabled copier, the scanned image will have processing instructions, in the form of metadata, attached to it. In some aspects, the metadata is extensible Markup Language (XML) encoded. The attached metadata guides the document through all desired processing steps automatically.

Accordingly, in a network of connected nodes, a method is provided for automatic digital document processing. The method comprises: embedding a processing profile with a digital document; and, processing the digital document in response to the embedded processing profile. Typically, embedding the processing profile includes generating a packet having a metadata section with the processing profile and a data section with the digital document. Then, processing the digital document includes a current node extracting current node process and routing instructions.

In some aspects of the method, processing the digital document includes the current (first) node determining a next (second) network-connected node from the node routing instructions. Then, the method further comprises: sending the metadata section packet from the current (first) node to the next (second) node; receiving the packet at the current (second) node; and, processing the digital document at the current (second) node. In some aspects, processing the digital document at the current (second) node includes: reading the processing profile in the metadata section; and, processing the digital document in response to the process instructions in the processing profile.

Additional details of the above-described method, and a system for automatic digital document processing in a network of connected devices are presented below.

BRIEF DESCRIPTION OF THE DRAWINGS

FIG. 6 is a flowchart illustrating the present invention method for automatic digital document processing in a network of connected nodes.

DETAILED DESCRIPTION OF THE PREFERRED EMBODIMENTS

Figure 1:
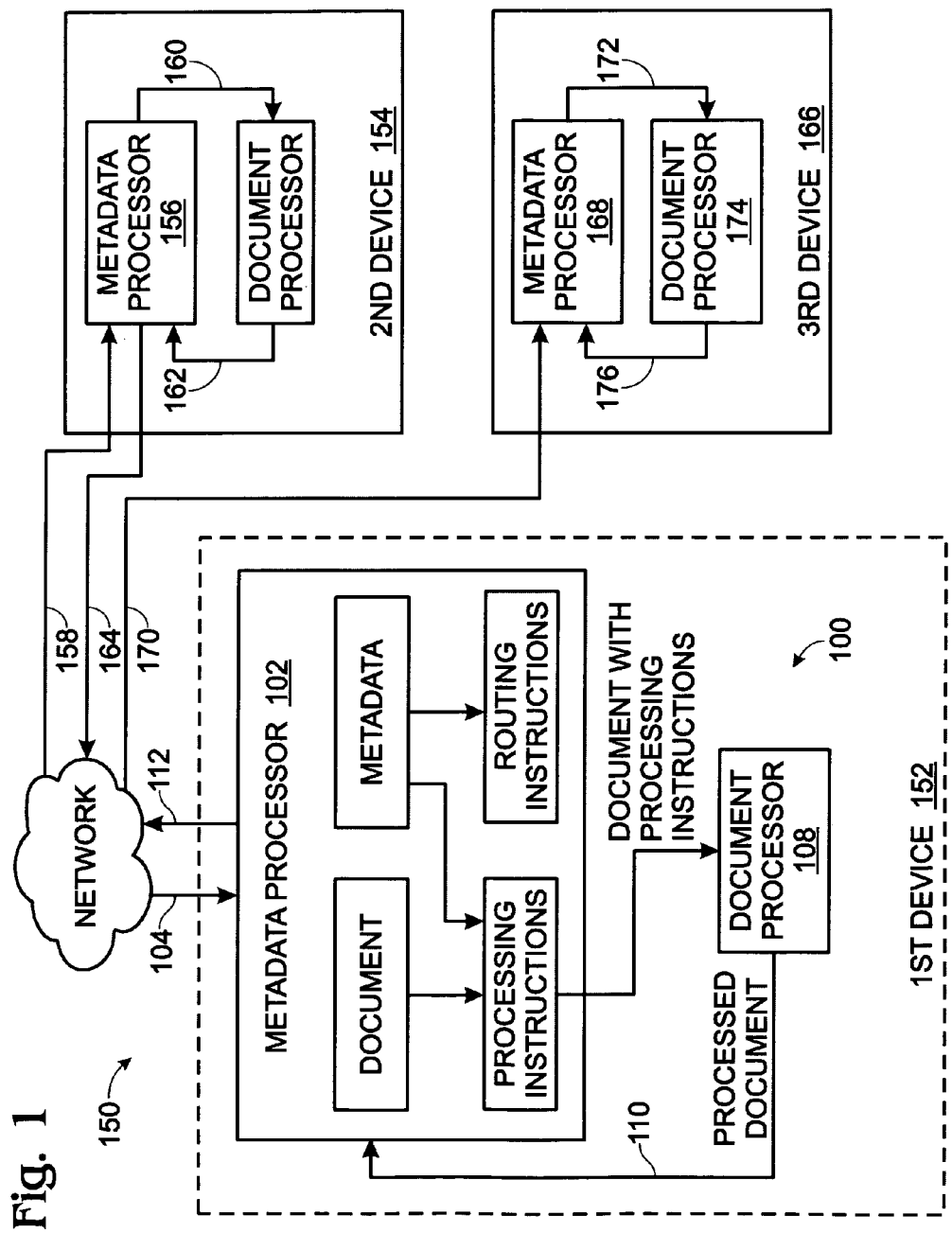
FIG. 1 is a schematic block diagram of the present invention system for automatic digital document processing in a network-connected device.

FIG. 1 is a schematic block diagram of the present invention system for automatic digital document processing in a network-connected device. The system 100 comprises a metadata processor 102 having a network-connected input on line 104 to accept a processing profile embedded with a digital document. The metadata processor 102 has an output on line 106 to supply the digital document and a processing profile. A document processor 108 has an input connected to the metadata processor output on line 106, and an output on line 110 to supply a processed digital document in response to the processing profile.

The metadata processor 102 accepts a packet with a metadata section including the processing profile, and a data section including the digital document. The document processor 108 processes the digital document in response to instructions in the metadata section processing profile.

Figure 2:
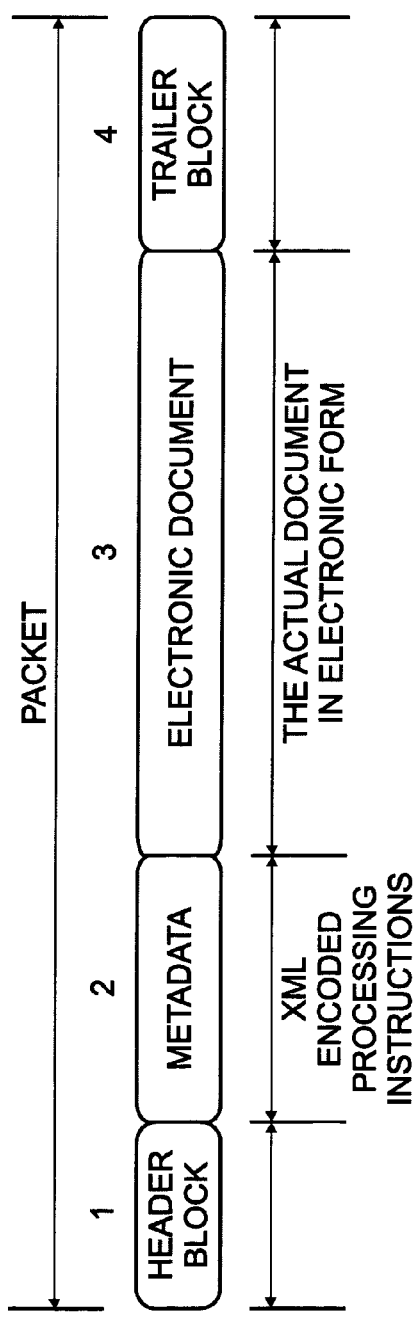
FIG. 2 is a diagram of an exemplary packet format.

FIG. 2 is a diagram of an exemplary packet format. As shown, in some aspects of the system the metadata processor accepts a packet metadata section written in the eXtensible Markup Language (XML). However, the metadata section need not necessarily be XML encoded. The metadata can be encoded in a either a well-known or proprietary language format. However, XML is the preferred language format. More specifically, the metadata processor typically accepts a packet including a beginning block, prior to the processing profile and data section, and an end block, subsequent to the processing profile and data section. However, other packet formats are possible.`

The header or beginning block (segment 1) marks the beginning of the package (packet). It includes some basic maintenance and identification information about the digital packet itself, such as information about the originator, author, time-stamp when the original document was created, packet sequence number, etc. In some aspects (as shown), all data in this block is encoded using XML.

The metadata block or processing profile (segment 2) includes all the business logic relevant to the document. It also includes detailed processing and routing instructions for processing the attached document. This block includes a list of all processing nodes (devices) along with node-specific processing instructions that are to be executed at each of the listed processing devices. The data in this block is encoded in XML. Again, however, other languages may be used in other aspects of the invention.

The electronic document block or data section (segment 3) includes the actual data of the digital document. As this packet travels between processing nodes the content of this block will change. It is also possible, if metadata instructions permit it, to preserve the original and/or intermediate versions of the document content. In such a case, this block may contain several versions of the original document. The metadata information controls the content of this block. In most cases, the content of this block will be the most recent version of the document that has been created by the previous node. All binary data in this block is enclosed within XML tags.

The trailer or end block (segment 4) marks the end of the package. It also includes information that ensures document integrity. As shown, the data in this block is encoded in XML. In other aspects of the invention, however, other languages may be used.

Returning to FIG. 1, the metadata processor 102 accepts the packet with a metadata section including process instructions cross-referenced to device routing instructions. The metadata processor 102 extracts the current processing profile associated with the (current) metadata processor address. Then, the document processor 108 processes the digital document in response to the current processing profile instructions.

In some aspects of the system 100, the metadata processor 102 accepts a packet metadata section with a plurality of process instructions and a corresponding plurality of routing instructions addressed to other network-connected devices. The metadata processor 102 accepts the processed digital document from the document processor on line 110 and reassembles the packet with the processed digital document. The metadata processor 102 sends the packet to a next network-connected device on line 112, in response to the routing instructions.

In other aspects, the metadata processor 102 accepts a packet metadata section with a plurality of process instructions and a corresponding plurality of routing instructions addressed to other network-connected devices. The metadata processor 102 accepts the processed digital document on line 110 from the document processor 108 and reassembles the packet with the processed digital document. Then, the metadata processor 102 sends the packet to a plurality of next network-connected devices on line 112 in response to the routing instructions. That is, the packet is sent to several network-connected devices (in parallel).

It should be understood that the elements of system 100 described above may be effectively enabled as a combination of nested software routines and buffers in a memory location. However, the elements can also be enabled using hardware, or combinations of hardware and software.

More generally, the invention can be described as a system 150 for automatic digital document processing in a network of connected devices. For example, the system 150 may include a first device 152 with a metadata processor 102 and document processor 108, as described in detail above in the explanation of system 100. As understood in the context of system 150, the first device metadata processor 102 accepts the processed digital document on line 110 from the document processor 108 and reassembles the packet with the processed digital document. Then, the first device metadata processor 102 sends the packet to a second network-connected device in response to the routing instructions.

The system 150 comprises at least a second device 154 including a metadata processor 156 having a network-connected input on line 158 to accept a processing profile embedded with a digital document from the first device 152. The second device metadata processor 156 has an output on line 160 to supply the digital document and a processing profile. A second device document processor 162 has an input connected to the metadata processor output on line 160 and an output on line 162 to supply a processed digital document in response to the processing profile. The present invention system 150 is not limited to any particular type of network communications format. Possible communication formats include TCP/IP, wireless, and serial data communications, to name but a few.

In some aspects of the system 150, the first device metadata processor 102 accepts a packet on line 104 additionally including third device process and routing instructions. The first device metadata processor 102 sends a reassembled packet on line 112 with a metadata section including the third device process and routing instructions to the second device 154. Note that the packet may also include instructions for the second device 154. The second device metadata processor 156 accepts the packet including third device process and routing instructions on line 158. The second device metadata processor 156 sends a reassembled packet on line 164 with a metadata section including the third device process and routing instructions to a third device.

Then, the system 150 further comprises a third device 166 including a metadata processor 168 having a network-connected input on line 170 to accept a processing profile embedded with a digital document from the second device 154. The third device metadata processor 168 has an output on line 172 to supply the digital document and a processing profile. A third device document processor 174 has an input connected to the metadata processor output on line 172 and an output on line 176 to supply a processed digital document in response to the processing profile. In other aspects, the reassembled packet to sent to a next device for further document processing.

In some aspects, the first device metadata processor 102 modifies the second device processing profile and sends the modified processing profile with the processed digital document in the reassembled packet on line 112. Although only the first device 150 has been discussed, other devices in the network possess the capability of modifying the processing instructions to subsequent devices. For example, if the first device 150 is unable to operate a particular instruction, due perhaps to a mechanical malfunction or memory limitation for example, the missing operation can be added to the processing instructions of the next device. Note that the system is not necessarily symmetrical. That is, not every device in the system is necessarily capable of changing the processing instructions. Neither is every device in the system necessarily capable of performing a process added or changed in the instructions by a previous device.

Although only three network-connected devices are shown, it should be understood that the present invention system 150 is not limited to any particular number of devices. Generally, the system 150 comprises a plurality of devices, where each device includes a metadata processor and document processor, as described above. In some aspects of the reassembled packet to the plurality of devices (in parallel) in response to routing instructions.

Functional Description

The present invention system and method provide a generic mechanism for automating the processing of electronic documents. The processing information for a digital document is directly included in the packet and it is provided in form of XML encoded instructions, referred to herein as metadata. These processing and routing instructions "travel" with the digital document from one processing device to another. The document processing may occur in one or more physical locations, since the document itself includes the metadata information.

This metadata information tells the processing device the operations that are to be performed to the attached digital document, and what to do with the package after all the processing steps have been performed. This flexibly allows for a very dynamic usage of a processing device. The metadata information also provides decision-making infrastructure that assists the processing device in decision-making process in abnormal cases. The present invention greatly reduces the involvement of a human in the process and increases the document process automation levels.

At any given processing device, the metadata information that is destined for that device is extracted and a set of requested operations are performed on the document. It is possible to execute different processing sequences, for different documents, automatically at the same processing station, without any direct human involvement in the process, thus achieving much higher degree of automation and flexibility. The end user and/or the system administrator typically create the processing and routing instructions in advance. These instructions are selected by the user at the time of the process instantiation.

The XML language and XML schemas makes it possible to create a generic infrastructure for efficient and intelligent digital content processing, and at the same time, to minimize the involvement of a human factor in the process. The use of XML enables the development of generic digital content processing nodes (devices). The processing nodes can be either hardware or software type nodes. Further, XML enables $3^{rd}$ party providers to build open systems.

The processing instructions, or the metadata, are an integral part of the electronic document. The invention makes use of the existing networking infrastructure and existing protocols for transporting a digital document from one processing node to another. XML metadata information is used for describing a sequence of desired processing operations and routing instructions for a digital document. The metadata, as well as the digital document, travel together as one unit, from one processing node to another, as shown in FIG. 2.

Each processing device parses the metadata block for its particular processing instructions. Once the instructions are found, the processing device executes only the relevant metadata instructions. When finished, the processing device updates the packet and forwards it to one or more destinations as defined in the metadata block routing instructions.

When the processing reaches the final destination, the metadata for that device may contain instructions to drop the metadata block completely, so that only the final document data reaches the final destination. The metadata information is attached to the electronic document at the time of document creation and may be updated/enhanced or even removed in response to one or more processing steps on the way to the final destination. In other words, it is not a mandatory that the metadata remains unchanged for the duration of document processing operations.

The processing device typically includes software that is capable of executing the present invention algorithm. Each processing device must be able to execute system-wide type commands, generic commands that are understood and executable by network-connected processing devices.

Figure 3:
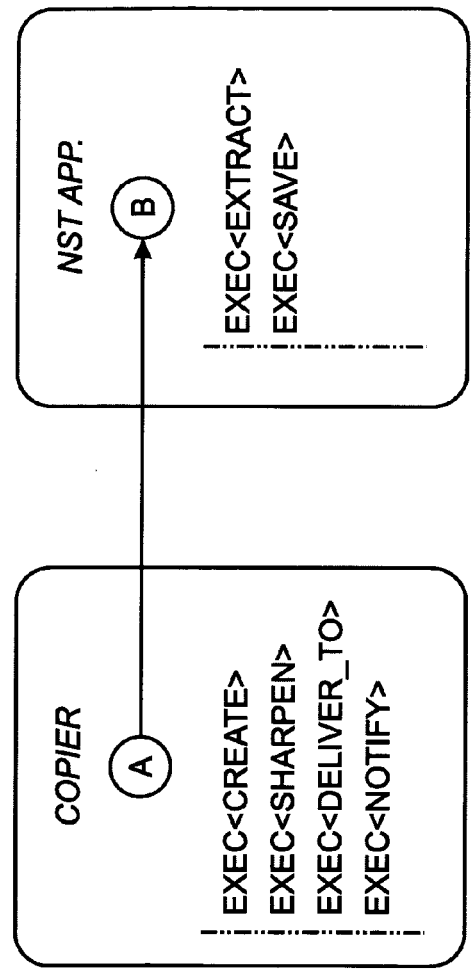
FIG. 3 is a diagram illustrating an exemplary present invention process flow.

FIG. 3 is a diagram illustrating an exemplary present invention process flow. The figure depicts a very simple case where digital content is processed at two locations. Process "A", in this example enabled by a copier device, initiates the processing by creating the digital document. It then executes image processing function "SHARPEN" on the original digital document. The purpose of this step could be to remove any noise data that could be found in the document. This device then delivers the document to the next stage and generates a notification event.

When the packet arrives at the delivery address node "B", which could be a software process running on the PC, a new thread begins execution. Metadata instructions direct this device to extract the digital document out of the packet and save it locally.

Figure 4:
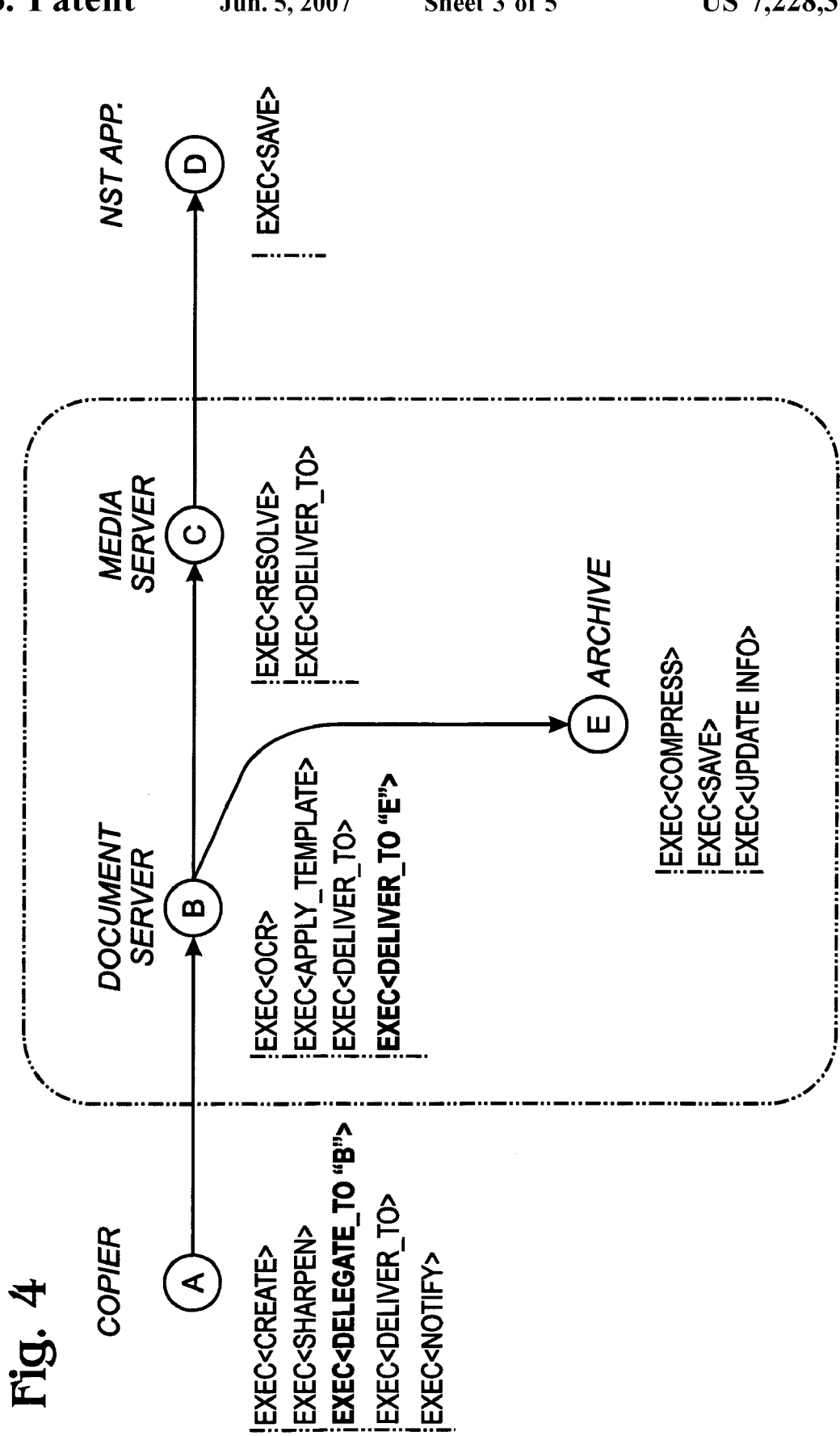
FIG. 4 is a more complex example of present invention document processing with a plurality of network-connected devices.

FIG. 4 is a more complex example of present invention document processing with a plurality of network-connected devices. In this example, several processing devices are involved in document processing. Devices (nodes) "A" and "D" are specified by the end user. The administrator in this example has imposed some additional rules on the use of the processing device "A", by mandating that the output of the processing device "A" always be directed to processing device "B" for some system processing. In this example the administrator has created an automatic archiving process for all documents processed at device "A". Although four devices are shown, there is no particular limitation to the number of devices that may be networked together.

Figure 5:
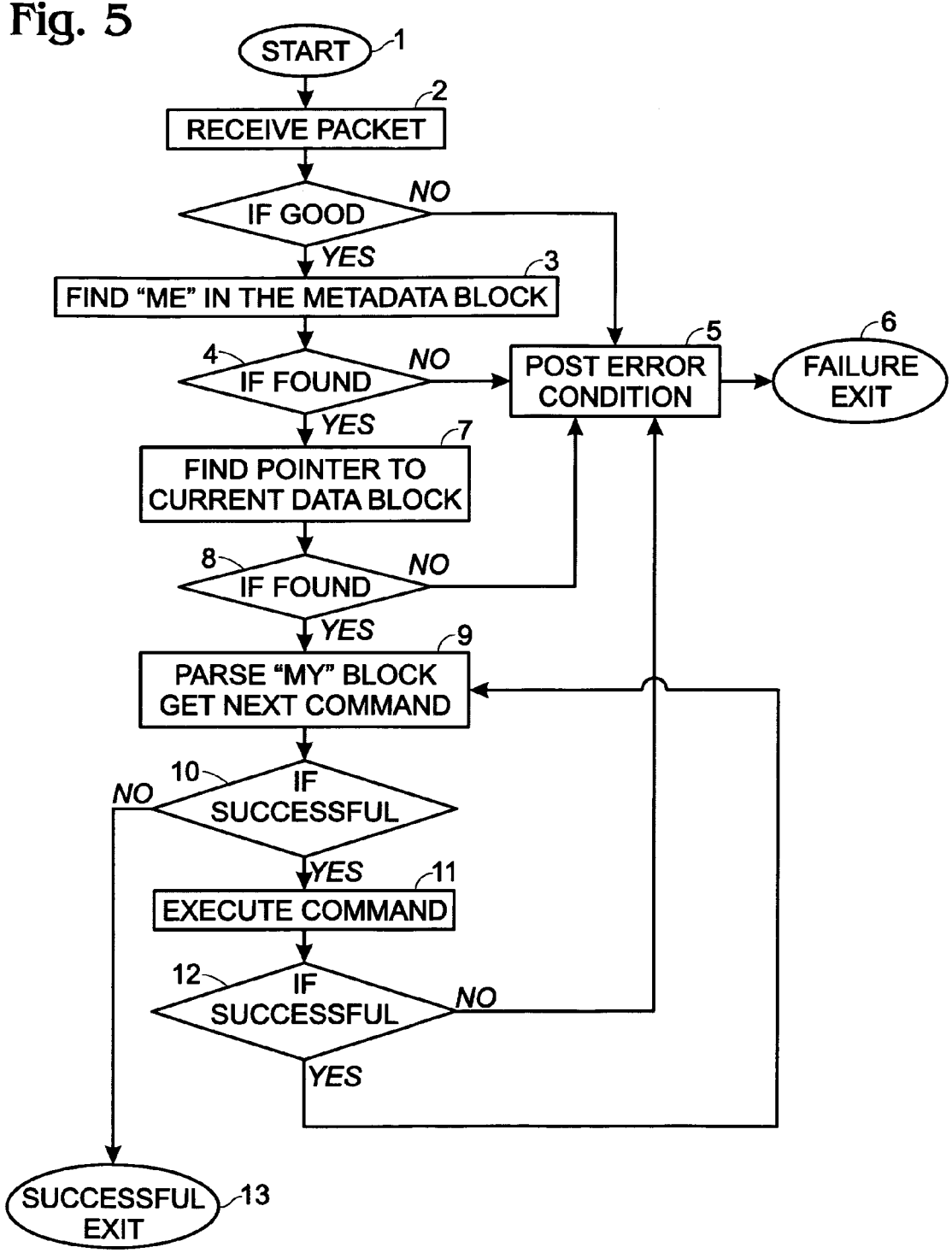
FIG. 5 is an exemplary present invention packet processing flowchart.

FIG. 5 is an exemplary present invention packet processing flowchart. Each of the numbered processing steps in the figure is described below:

| STEP | DESCRIPTION |
| --- | --- |
| 1 | Start - this is the entry point into the algorithm. |
| 2 | Receive Packet - the receiving device verifies that the received packet conforms to the packet format definition and that no data has been lost during the transfer. If a security protocol is used, authentication and validation of the user credentials occurs. |
| 3 | Find "ME" in the metadata block - that is, find instructions addressed to this device. The processing device extracts the relevant metadata from the metadata block. Instructions that are destined for other devices are ignored. |
| 4 | If found - check that a metadata block destined for this processing device has been found. Failure to find a metadata block with specific instructions for this processing node is |

-continued

| STEP | DESCRIPTION |
|------|-------------|
|      | considered a fatal error condition. |
| 5    | Post the Error Condition - this error condition is posted to the system/user. |
| 6    | Failure Exit - this is the exit point out of the algorithm in case of an error condition is encountered. |
| 7    | Find Pointer To Current Data Block - verify that there is data block valid for processing by this processing node. Failure to find a data block is considered a fatal error condition. |
| 8    | If found - check that there is at least one valid data block for this processing node. Failure to find a data block is considered a fatal error condition |
| 9    | Parse "MY" Block. Get Next Command - parse through the list of commands pre-assigned for this processing node. Execute. |
| 10   | If successful - in cases when there is no new instruction found, exit the processing algorithm via Step 13. |
| 11   | Execute Command - try to execute the command. In case of a fault condition, a proper error condition is posted to the rest of the system via Step 5. |
| 12   | If successful - if a current command execution is completed successfully, the execution flow is directed back to Step 9. |
| 13   | Successful EXIT - this is the exit point from the algorithm when no fatal error conditions have been encountered. Please note that this step does not forward the packet to the next processing stage. It has already been done, if required, as one of the commands executed in Step 11. |

FIG. 6 is a flowchart illustrating the present invention method for automatic digital document processing in a network of connected nodes. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 600.

Step 602 generates a processing profile. Step 604 embeds the processing profile generated in Step 602 with a digital document. Step 606 processes the digital document in response to the embedded processing profile.

In some aspects of the method, embedding the processing profile with a digital document in Step 604 includes generating a packet having a metadata section with the processing profile and a data section with the digital document. Then, processing the digital document in response to the embedded processing profile in Step 606 includes a current node extracting current node process and routing instructions.

In other aspects, embedding the processing profile with a digital document in Step 604 includes creating a metadata section with the processing profile written in the extensible markup language (XML). In some aspects, generating a packet having a metadata section with the processing profile and a data section with the digital document in Step 604 includes generating a beginning block, prior to the processing profile and data section, and an end block, subsequent to the processing profile and data section.

In some aspects of the method, processing the digital document in response to the embedded processing profile in Step 606 includes a current (first) node determining a next (second) network-connected node from the node routing instructions. Then, the method comprises further steps. Step 608 sends the metadata section packet from the current (first) node to the next (second) node. Step 610 receives the packet at the current (second) node. Step 612 processes the digital document at the current (second) node.

In other aspects, processing the digital document at the current (second) node in Step 612 includes substeps. Step 612a reads the processing profile in the metadata section. Step 612b identifies process instructions associated with the current (second) node. Step 612c processes the digital document with the (identified) process instructions.

In some aspects, processing the digital document at the current (second) node in Step 612 includes determining a next (third) network-connected node from the node routing instructions. Then, the method comprises further steps. Step 614 sends the metadata section packet from the current (second) node to the next (third) node. Step 616 receives the packet at the current (third) node. Step 618 processes the digital document at the current (third) node.

In some aspects of the method, processing the digital document in response to the embedded processing profile in Step 606 includes determining a plurality next network-connected nodes from the node routing instructions. Then, sending a packet with the digital document and embedded processing profile addressed to the next node in Step 608 includes sending the packet to the plurality of nodes.

Some aspects of the method include further steps. Step 607, subsequent to processing the digital document at the current (first) node, modifies the process instructions in the embedded processing profile for the next (second) node. Sending the metadata section packet from the current (first) node to the next (second) node in Step 608 includes sending the modified process instructions. Then, processing the digital document at the current (second) node in Step 612 includes processing the digital document with the modified process instructions.

A system and method has been provided for automatically processing digital documents in a network of connected devices (nodes). A few examples have been given of specific implementations, however, the invention is not limited to merely these examples. Although the invention has been described as including XML coded metadata, the invention is not limited to any particular language. Neither is the invention limited to any particular network communication format. Other variations and embodiments of the invention will occur to those skilled in the art.

I claim:

1. In a network of connected nodes, a method for automatic digital document processing, the method comprising:

embedding a processing profile with a digital document at an originating node;

sending the digital document to a first node;

extracting first node process instructions and node routing instructions from the processing profile;

processing the digital document in response to the process instructions;

wherein embedding the processing profile with a digital document includes creating a metadata section with the processing profile written in the extensible markup language (XML);

determining a second network-connected node from the node routing instructions;

sending the metadata section packet from the first node to the second node;

receiving the packet at the second node; and, processing the digital document at the second node.

2. The method of claim 1 wherein embedding the processing profile with a digital document includes generating a packet having a metadata section with the processing profile and a data section with the digital document.

3. The method of claim 2 wherein processing the digital document at the second node includes:
reading the processing profile in the metadata section; and,
processing the digital document in response to the process instructions in the processing profile.

4. The method of claim 2 wherein processing the digital document at the second node includes:
reading the processing profile in the metadata section;
identifying process instructions associated with the second node; and,
processing the digital document with the identified process instructions.

5. The method of claim 3 further comprising:
determining a third network-connected node from the node routing instructions;
sending the metadata section packet from second node to the third node;
receiving the packet at the third node; and,
processing the digital document at the third node.

6. The method of claim 2 wherein determining the second node from the node routing instructions includes determining a plurality next network-connected nodes from the node routing instructions; and,
wherein sending a packet with the digital document and embedded processing profile addressed to the second node includes sending the packet to the plurality of nodes.

7. The method of claim 2 further comprising:
subsequent to processing the digital document at the first node, modifying the process instructions in the embedded processing profile for the second node;
wherein sending the metadata section packet from the first node to the second node includes sending the modified process instructions; and,
wherein processing the digital document at the second node includes processing the digital document with the modified process instructions.

8. The method 1 further comprising:
generating a processing profile; and,
wherein embedding a processing profile with a digital document includes embedding the generated processing profile.

9. The method of claim 2 wherein generating a packet having a metadata section with the processing profile and a data section with the digital document includes generating a beginning block, prior to the processing profile and data section, and an end block, subsequent to the processing profile and data section.

10. In a network of connected devices, a system for automatic digital document processing, the system comprising:
a first device including:
a metadata processor having a network-connected input to accept a processing profile, with processing instructions cross-referenced to device routing instructions, embedded with a digital document and an output to supply the digital document and processing instructions;
a document processor having an input connected to the metadata processor output, and an output to supply a processed digital document in response to the processing instructions; and,
wherein the metadata processor accepts the processed digital document from the document processor, reassembles the packet with the processed digital document and sends the packet to a second network-connected device in response to the routing instructions;
at least a second device including:
a metadata processor having a network-connected input to accept a processing profile embedded with a digital document from the first device and an output to supply the digital document and processing instructions;
a document processor having an input connected to the metadata processor output, and an output to supply a processed digital document in response to the processing instructions.

11. The system of claim 10 wherein the first device metadata processor accepts a packet additionally including third device process and routing instructions and sends a reassembled packet with a metadata section including the third device process and routing instructions to the second device;
wherein the second device metadata processor accepts the packet including third device process and routing instructions and sends a reassembled packet with a metadata section including the third device process and routing instructions to a third device; and
the system further comprising:
a third device including:
a metadata processor having a network-connected input to accept a processing profile embedded with a digital document from the second device and an output to supply the digital document and processing instructions; and,
a document processor having an input connected to the metadata processor output, and an output to supply a processed digital document in response to the processing instructions.

12. The system of claim 10 wherein the first device metadata processor modifies the second device processing profile and sends the modified processing profile with the processed digital document in the reassembled packet.

13. The system of claim 10 further comprising a plurality of devices, each device including:
a metadata processor having a network-connected input to accept a processing profile embedded with a digital document and an output to supply the digital document and processing instructions;
a document processor having an input connected to the metadata processor output, and an output to supply a processed digital document in response to the processing instructions; and,
wherein the first device metadata processor sends the reassembled packet to the plurality of devices in response to routing instructions.

14. The system of claim 10 wherein the first device metadata processor accepts a packet metadata section written in the extensible markup language (XML) sends a reassembled packet metadata section written in XML.

* * * * *